US011667278B2

(12) United States Patent
Kim

(10) Patent No.: US 11,667,278 B2
(45) Date of Patent: Jun. 6, 2023

(54) APPARATUS FOR CONTROLLING PLATOONING, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventor: Jung Wan Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 275 days.

(21) Appl. No.: 17/082,921

(22) Filed: Oct. 28, 2020

(65) Prior Publication Data

US 2022/0041159 A1    Feb. 10, 2022

(30) Foreign Application Priority Data

Aug. 5, 2020   (KR) .......................... 10-2020-0098164

(51) Int. Cl.
*B60W 30/09*   (2012.01)
*G08G 1/00*   (2006.01)
(Continued)

(52) U.S. Cl.
CPC ............ *B60W 30/09* (2013.01); *B60W 10/18* (2013.01); *B60W 10/20* (2013.01); *B60W 30/02* (2013.01);
(Continued)

(58) Field of Classification Search
CPC ........... B60W 30/09; B60W 30/18172; B60W 10/18; B60W 10/20; B60W 30/02;
(Continued)

(56) References Cited

U.S. PATENT DOCUMENTS

2006/0217867 A1*   9/2006   Ono .................... B62D 6/003
                                                                701/41
2015/0151749 A1*   6/2015   Tsuchiya ............. B60W 10/188
                                                                701/41
(Continued)

FOREIGN PATENT DOCUMENTS

KR           20200027073 A        3/2020

*Primary Examiner* — Jason Holloway
(74) *Attorney, Agent, or Firm* — Morgan, Lewis & Bockius LLP

(57) ABSTRACT

A platooning control apparatus, a system including the same, and a method thereof are provided. disclosure The platooning control apparatus may include: a processor configured to determine a possibility of a collision during platooning, and when the possibility of the collision exists, perform collision avoidance control or braking control depending on whether an anti-lock brake system (ABS) is operated; and a storage configured to store data obtained by the processor and an algorithm for driving the processor, wherein the apparatus may calculate a depressurization amount of the braking pressure depending on a vehicle speed, a vehicle weight, and a state of a road surface when the avoidance control is possible during ABS operation, and may control eccentric braking depending on the depressurization amount of the braking pressure, to perform the avoidance control.

15 Claims, 19 Drawing Sheets

(51) Int. Cl.
*B60W 30/095* (2012.01)
*B60W 10/20* (2006.01)
*B60W 10/18* (2012.01)
*B60W 40/105* (2012.01)
*B60W 40/13* (2012.01)
*B60W 40/06* (2012.01)
*B60W 30/02* (2012.01)
*B60W 30/16* (2020.01)
*G05D 1/02* (2020.01)
*G08G 1/16* (2006.01)

(52) U.S. Cl.
CPC .......... *B60W 30/095* (2013.01); *B60W 30/16* (2013.01); *B60W 40/06* (2013.01); *B60W 40/105* (2013.01); *B60W 40/13* (2013.01); *G05D 1/0291* (2013.01); *G08G 1/16* (2013.01); *G08G 1/22* (2013.01); *B60W 2510/182* (2013.01); *B60W 2530/10* (2013.01); *B60W 2552/00* (2020.02)

(58) Field of Classification Search
CPC .... B60W 30/095; B60W 30/16; B60W 40/06; B60W 40/105; B60W 40/13; B60W 2510/182; B60W 2530/10; B60W 2552/00; B60W 2720/26; B60W 30/08; B60W 30/165; B60W 2552/40; B60W 2556/45; B60W 60/001; B60W 2050/0005; G05D 1/0291; G05D 2201/0213; G05D 1/0293; G05D 1/0236; G05D 1/0214; G05D 1/0221; G05D 1/0223; G05D 1/024; G05D 1/0242; G05D 1/0246; G05D 1/0255; G05D 1/0257; G05D 1/0259; G05D 1/0261; G05D 1/0276; G05D 1/0278; G05D 1/028; G05D 1/0289; G05D 2201/02; G05D 1/0088; G05D 1/0295; G08G 1/16; G08G 1/22; B60T 2210/12; B60T 2270/10; B60Y 2300/08; B60Y 2300/165
See application file for complete search history.

(56) References Cited

U.S. PATENT DOCUMENTS

2017/0137023 A1* 5/2017 Anderson .............. B60G 17/02
2020/0166953 A1* 5/2020 Sabau ...................... G08G 1/22

* cited by examiner

ROAD SURFACE FRICTION [EMPTY VEHICLE]

| ROAD SURFACE DETERMINATION MAP g(9.8m/s^2) | | Ice | snow | wet asphalt | dry asphalt |
|---|---|---|---|---|---|
| VEHICLE SPEED | 10 | 1.2g | 2.5g | 3.5g | 4.5g |
| | 30 | 1.3g | 2.6g | 3.7g | 4.7g |
| | 50 | 1.4g | 2.7g | 3.9g | 4.9g |
| | 80 | 1.5g | 2.8g | 2.8g | 5.1g |

MEASUREMENT FOR EACH VEHICLE WEIGHT

ROAD SURFACE FRICTION [HEAVY VEHICLE]

| ROAD SURFACE DETERMINATION MAP g(9.8m/s^2) | | Ice | snow | wet asphalt | dry asphalt |
|---|---|---|---|---|---|
| VEHICLE SPEED | 10 | 1.5g | 2.8g | 4.1g | 5.1g |
| | 30 | 1.6g | 2.9g | 4.2g | 5.3g |
| | 50 | 1.7g | 3.0g | 4.3g | 5.5g |
| | 80 | 1.8g | 3.1g | 4.4g | 5.7g |

ROAD SURFACE FRICTION [LOADED VEHICLE]

| ROAD SURFACE DETERMINATION MAP g(9.8m/s^2) | | Ice | snow | wet asphalt | dry asphalt |
|---|---|---|---|---|---|
| VEHICLE SPEED | 10 | 1.7g | 3.0g | 4.3g | 5.5g |
| | 30 | 1.9g | 3.1g | 4.4g | 5.3g |
| | 50 | 2.0g | 3.2g | 4.5g | 5.9g |
| | 80 | 2.1g | 3.3g | 4.7g | (6.0g) |

CORRESPONDING SHEET WHEEL RESILIENCE MEASUREMENT

Fig.12

BASED ON BRAKING SYSTEM HAVING 9.5 BARS OF SYSTEM PRESSURE

| MINUS DELTA P (PRESSURE) TO MAINTAIN MAXIMUM PRESSURE (WHEELLOCK FRICTION) LEVEL AT PEAK POINT PRESSURE | | ROAD SURFACE FRICTION [EMPTY VEHICLE] | | | |
|---|---|---|---|---|---|
| | | Ice | snow | wet asphalt | dry asphalt |
| VEHICLE SPEED | 10 | 0.1bar | 0.2bar | 0.25bar | 0.39bar |
| | 30 | 0.13bar | 0.21bar | 0.27bar | 0.4bar |
| | 50 | 0.15bar | 0.22bar | 0.28bar | 0.41bar |
| | 80 | 0.18bar | 0.23bar | 0.29bar | 0.42bar |

MEASUREMENT FOR EACH VEHICLE WEIGHT

...

| MINUS DELTA P (PRESSURE) TO MAINTAIN MAXIMUM PRESSURE (WHEELLOCK FRICTION) LEVEL AT PEAK POINT PRESSURE | | ROAD SURFACE FRICTION [HEAVY VEHICLE] | | | |
|---|---|---|---|---|---|
| | | Ice | snow | wet asphalt | dry asphalt |
| VEHICLE SPEED | 10 | 0.1bar | 0.2bar | 0.25bar | 0.39bar |
| | 30 | 0.13bar | 0.21bar | 0.27bar | 0.4bar |
| | 50 | 0.15bar | 0.22bar | 0.28bar | 0.41bar |
| | 80 | 0.18bar | 0.23bar | 0.29bar | 0.42bar |

...

| MINUS DELTA P (PRESSURE) TO MAINTAIN MAXIMUM PRESSURE (WHEELLOCK FRICTION) LEVEL AT PEAK POINT PRESSURE | | ROAD SURFACE FRICTION [LOADED VEHICLE] | | | |
|---|---|---|---|---|---|
| | | Ice | snow | wet asphalt | dry asphalt |
| VEHICLE SPEED | 10 | 0.13bar | 0.23bar | 0.38bar | 0.8bar |
| | 30 | 0.15bar | 0.25bar | 0.4bar | 0.86bar |
| | 50 | 0.18bar | 0.29bar | 0.5bar | 0.94bar |
| | 80 | 0.2bar | 0.31bar | 0.54bar | 1.05bar |

Fig. 13

APPARATUS FOR CONTROLLING PLATOONING, SYSTEM HAVING THE SAME AND METHOD THEREOF

CROSS-REFERENCE TO RELATED APPLICATION

The present application claims priority to and the benefit of Korean Patent Application No. 10-2020-0098164, filed on Aug. 5, 2020, the entire contents of which are incorporated herein by reference.

TECHNICAL FIELD

The present disclosure relates to a platooning control apparatus, a system including the same, and a method thereof.

BACKGROUND

Platooning is a technique for performing autonomous driving in a state in which a plurality of vehicles are disposed in a line at predetermined intervals. A leading vehicle, which is a vehicle positioned at a forefront of a platooning vehicle group, may control one or more following vehicles following the leading vehicle while performing platooning.

When performing such platooning, an inter-vehicle distance between vehicles should be narrowly maintained to improve fuel economy, thereby minimizing an increase in air resistance and intervention of other vehicles into the platooning vehicle group. When the inter-vehicle distance is narrowly maintained as described above, it is difficult to exclude a possibility of a collision during emergency braking caused by a danger situation ahead.

Therefore, many techniques are being developed to maintain safety while keeping the inter-vehicle distance narrow. However, despite development of these techniques, collisions between platooning vehicles caused by external factors such as changes in road surface friction, gradient changes, and brake deterioration cannot be completely excluded, and in the case of a moving body with a large vehicle weight, such as a freight car, large collision energy according to inertia is also generated. In this case, when a leading vehicle in the platooning vehicle group is pushed forward due to a cumulative amount of impact applied to the leading vehicle, a major accident with other vehicles may occur.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a platooning control apparatus, a system including the same, and a method thereof, capable of reducing an impact of a chain collision from being concentrated on a preceding vehicle by using a slip ratio of a road surface when emergency braking is performed during platooning driving.

In particular, an exemplary embodiment of the present disclosure provides a platooning control apparatus, a system including the same, and a method thereof, capable of reducing an impact of a chain collision from being concentrated on a preceding vehicle by collision energy using a grip force between a tire and a road surface in all cases of a region at which braking pressure that is lower than critical friction of the road surface is generated (before ABS entering) or after a road surface limit (ABS control application/wheel slip generation).

The technical objects of the present disclosure are not limited to the objects mentioned above, and other technical objects not mentioned can be clearly understood by those skilled in the art from the description of the claims.

An exemplary embodiment of the present disclosure provides a platooning control apparatus including: a processor configured to determine a possibility of a collision occurring during platooning, and when the collision possibility exists, perform collision avoidance control or braking control depending on whether an anti-lock brake system (ABS) is operated by determining whether the ABS is operated; and a storage configured to store data obtained by the processor and an algorithm for driving the processor, wherein the apparatus may calculate a depressurization amount of the braking pressure depending on a vehicle speed, a vehicle weight, and a state of a road surface when the avoidance control is possible during ABS operation, and may control eccentric braking depending on the depressurization amount of the braking pressure, to perform the avoidance control.

In an exemplary embodiment, the processor may determine the state of the road surface depending on a speed resilience, a vehicle speed, and a vehicle weight.

In an exemplary embodiment, the storage stores a road surface determination map for storing the speed resilience matched to the vehicle speed and the state of the road surface for each vehicle weight; and a depressurization amount setting map for storing the depressurization amount matched to the vehicle speed and the state of the road surface is stored for each vehicle weight.

In an exemplary embodiment, the processor, when collision avoidance control is possible while the ABS is operated, may control an avoidance direction of following vehicles in a zigzag form based on a preceding vehicle.

In an exemplary embodiment, the processor, when collision avoidance control is possible while the ABS is operated, may maintain ABS control by applying a highest road surface friction coefficient to wheels inside turning, and reduces braking pressure applied to the wheels outside turning to perform partial.

In an exemplary embodiment, the processor may maintain steer control when the ABS is not operated and controls an increase in braking pressure of vehicle wheels depending on an abnormal braking force curve.

In an exemplary embodiment, the processor may increase braking pressure applied to front wheels of a vehicle and decrease braking pressure applied to rear wheels thereof, depending on the abnormal braking force curve when deceleration of the vehicle is increased.

In an exemplary embodiment, the processor, when collision avoidance control is impossible while the ABS is operated, may perform slip control of vehicle wheels capable of maintaining steering control and minimizing a braking distance of vehicle wheels.

In an exemplary embodiment, the processor may induce a side collision of the vehicle by controlling collision avoidance control and left wheel slip and right wheel slip when there is a possibility of a collision of the vehicle.

In an exemplary embodiment, the processor may calculate a stopping braking distance of a preceding vehicle and a stopping braking distance of a host vehicle by using deceleration of the preceding vehicle and deceleration of the host vehicle, and determines the possibility of the collision by using the stopping braking distance of the preceding vehicle and the stopping braking distance of the host vehicle.

An exemplary embodiment of the present disclosure provides a vehicle system including: a platooning control apparatus configured to determine a possibility of a collision occurring during platooning, and when the collision possibility exists, perform collision avoidance control or braking control depending on whether an anti-lock brake system (ABS) is operated by determining whether the ABS is operated; and a communication device configured to transmit commands of collision avoidance control and braking control received from the platooning control apparatus to platooning vehicles, the platooning control apparatus, when collision avoidance control is possible while the ABS is operated, may calculate a depressurization amount of braking pressure depending on a vehicle speed, a vehicle weight, and a state of a road surface, and controls eccentric braking depending on the depressurization amount of the braking pressure.

In an exemplary embodiment, the platooning control apparatus may determine the state of the road surface depending on a speed resilience, a vehicle speed, and a vehicle weight.

In an exemplary embodiment, the platooning control apparatus, when collision avoidance control is possible while the ABS is operated, may control an avoidance direction of following vehicles in a zigzag form based on a preceding vehicle.

In an exemplary embodiment, the platooning control apparatus, when collision avoidance control is possible while the ABS is operated, may maintain ABS control by applying a highest road surface friction coefficient to wheels inside turning, and reduces braking pressure applied to the wheels outside turning to perform partial.

An exemplary embodiment of the present disclosure provides a platooning control method including: determining a possibility of a collision during platooning; determining whether an anti-lock brake system (ABS) is operated when there is the possibility of the collision; performing collision avoidance control or braking control depending on whether the ABS is operated; and transmitting commands of collision avoidance control and braking control to platooning vehicles.

In an exemplary embodiment, the determining of the possibility of the collision during the platooning may include calculating a stopping braking distance of a preceding vehicle and a stopping braking distance of a host vehicle by using deceleration of the preceding vehicle and deceleration of the host vehicle, and determines the possibility of the collision by using the stopping braking distance of the preceding vehicle and the stopping braking distance of the host vehicle.

In an exemplary embodiment, the performing of the collision avoidance control or the braking control depending on whether the ABS is operated may include determining the state of the road surface depending on a speed resilience, a vehicle speed, and a vehicle weight.

In an exemplary embodiment, the performing of the collision avoidance control or the braking control depending on whether the ABS is operated, when collision avoidance control is possible while the ABS is operated, may include controlling an avoidance direction of following vehicles in a zigzag form based on a preceding vehicle.

In an exemplary embodiment, the performing of the collision avoidance control or the braking control depending on whether the ABS is operated, when collision avoidance control is possible while the ABS is operated, may include maintaining ABS control by applying a highest road surface friction coefficient to wheels inside turning, and reduces braking pressure applied to the wheels outside turning to perform partial.

In an exemplary embodiment, the performing of the collision avoidance control or the braking control depending on whether the ABS is operated may include maintaining steer control when the ABS is not operated and controls an increase in braking pressure of vehicle wheels depending on an abnormal braking force curve.

According to this technique, it may be possible to reduce the impact of a chain collision from being concentrated on the preceding vehicle by using the road surface slip rate when emergency braking is performed during platooning.

In addition, various effects that can be directly or indirectly identified through this document may be provided.

DRAWINGS

FIG. 10A, FIG. 10B, FIG. 10C, and FIG. 10D illustrate views for describing an example of optimal frictional force control using a Mu slip curve in one form of the present disclosure.

Figure 11A:
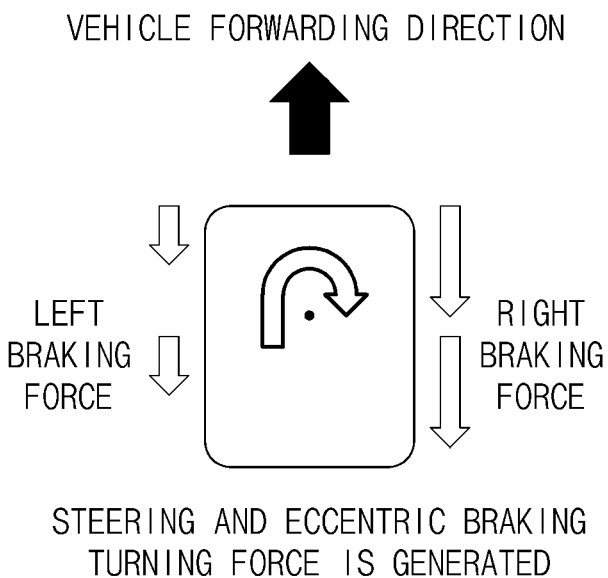
Figure 11B:
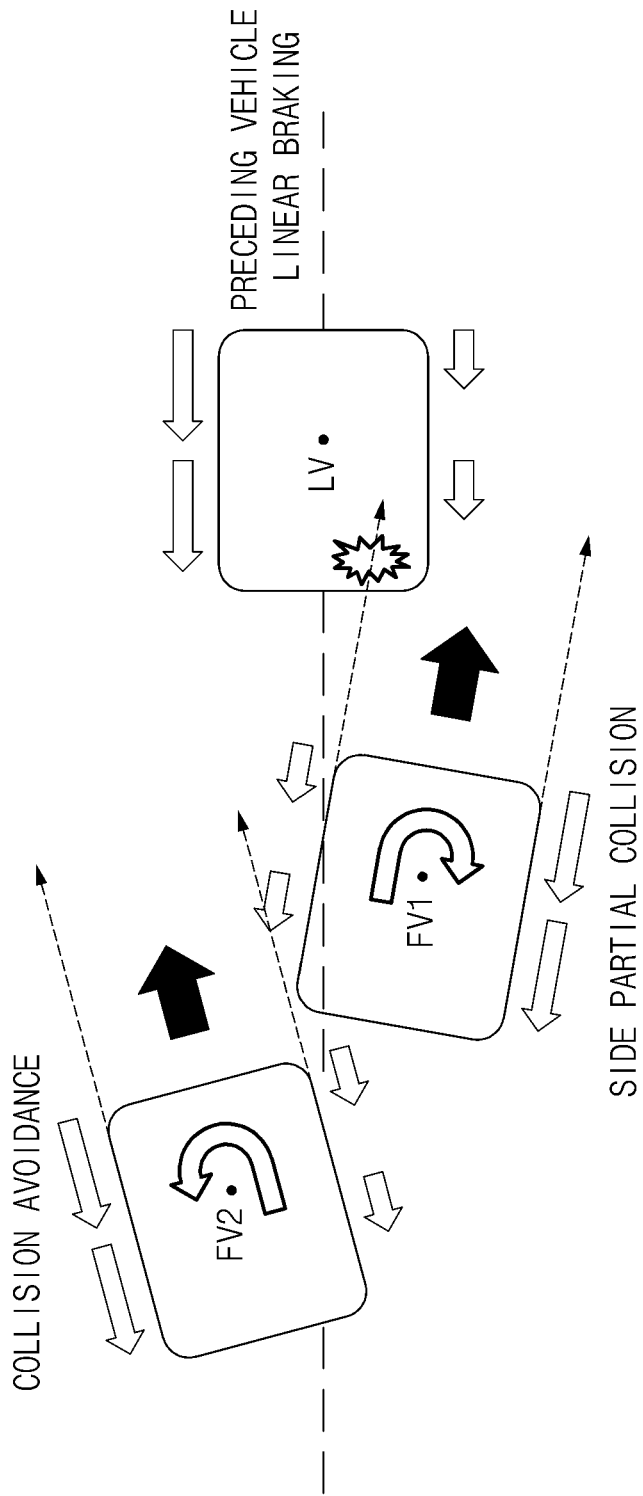

FIG. 11A and FIG. 11B illustrate views for describing a vehicle traveling direction in one form of the present disclosure.

FIG. 12 illustrates an example of a screen showing a road surface determination map in one form of the present disclosure.

FIG. 13 illustrates an example of a screen showing a road surface determination map in one form of the present disclosure.

Figure 14:
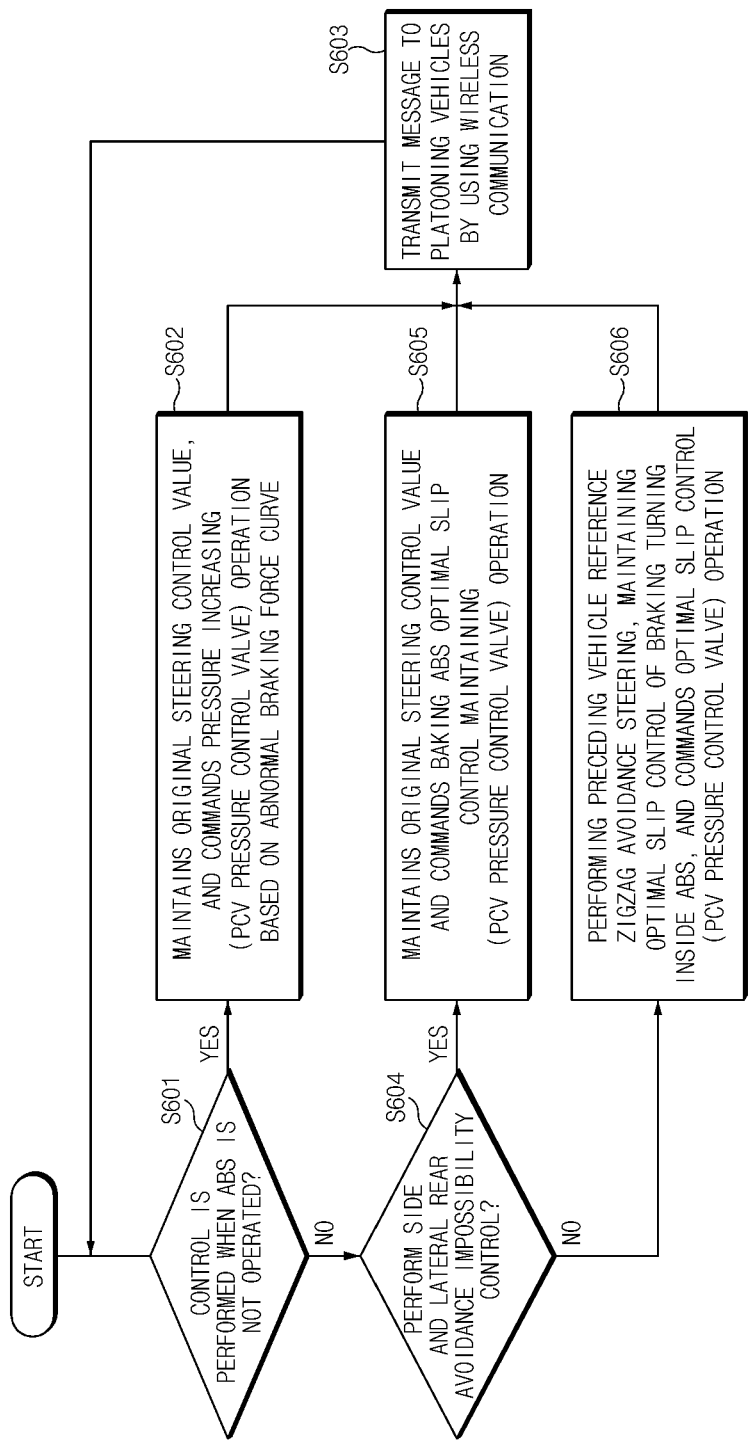

FIG. 14 illustrates a flowchart for specifically describing a vehicle control method for reducing collision energy when emergency braking is performed during platooning driving in one form of the present disclosure.

Figure 15:
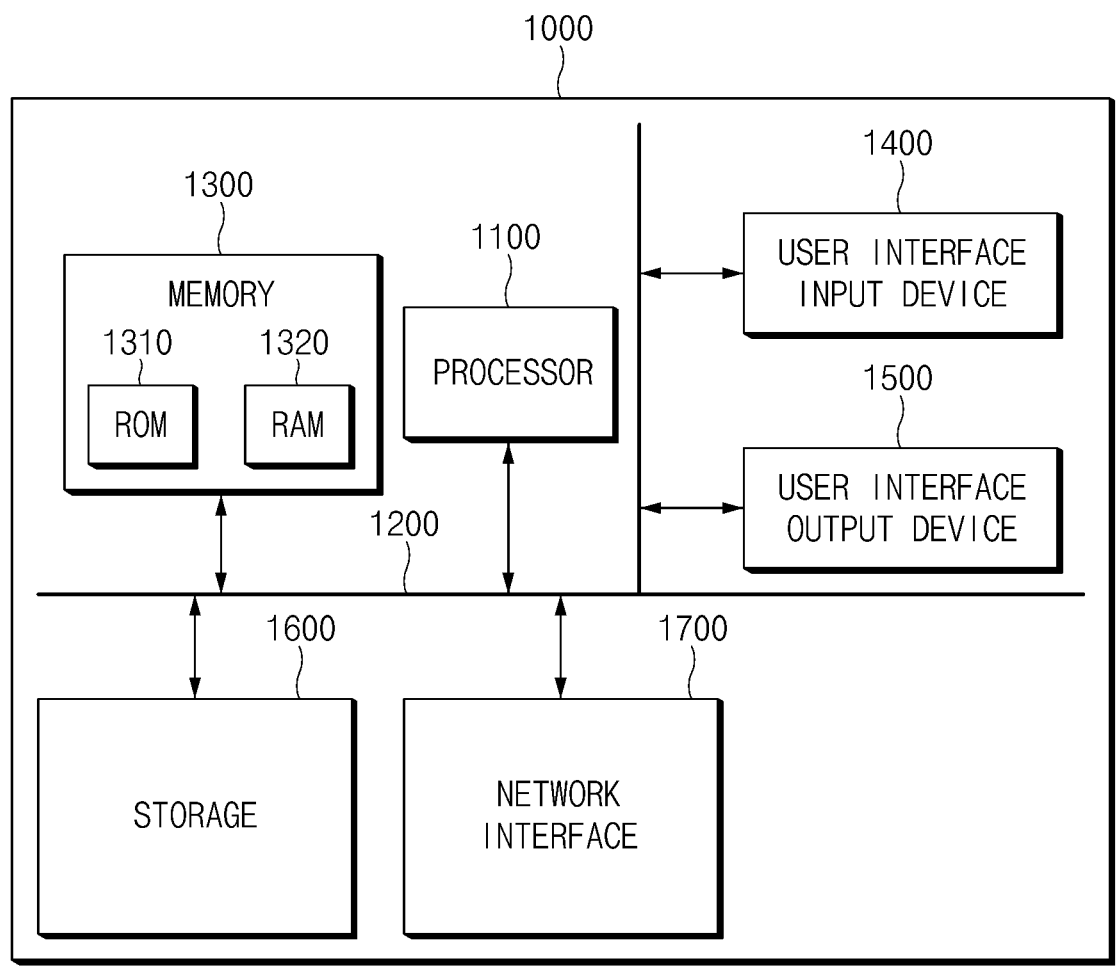

FIG. 15 illustrates a computing system in one form of the present disclosure.

DETAILED DESCRIPTION

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 15.

Figure 1:
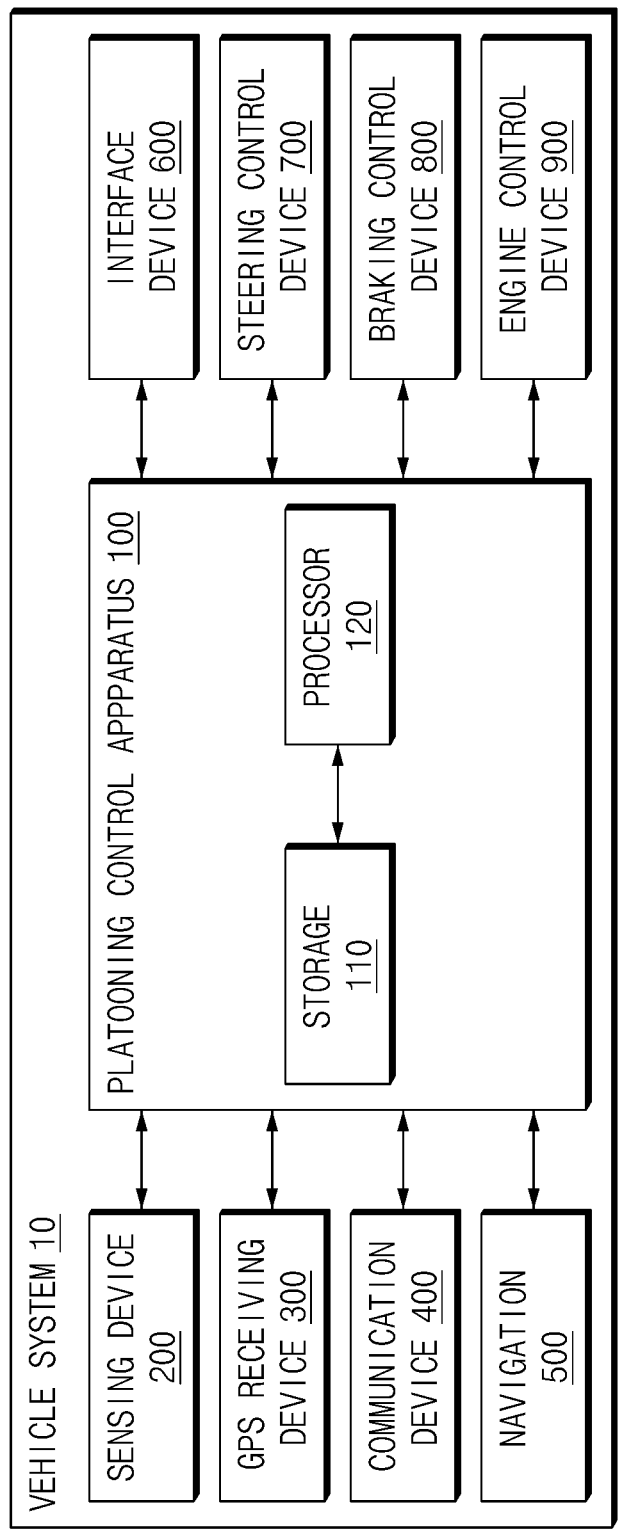
FIG. 1 illustrates a block diagram showing a configuration of a vehicle system including a platooning control apparatus in one form of the present disclosure.
Figure 2:
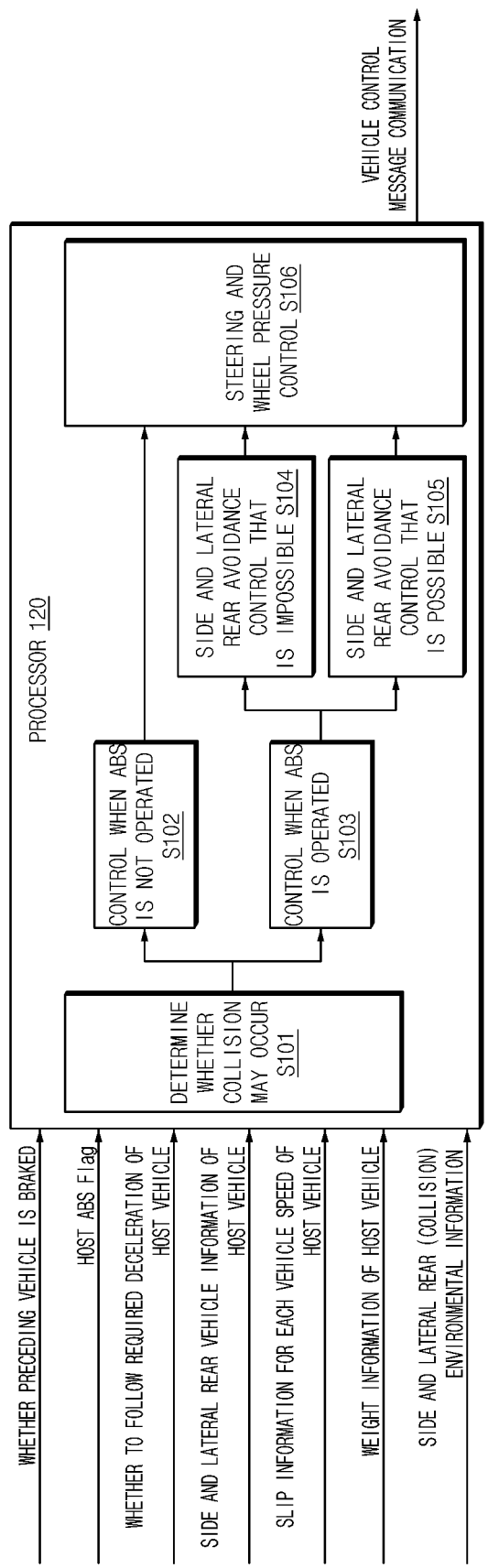
FIG. 2 illustrates an operation flow of a platooning control apparatus in one form of the present disclosure.

FIG. 1 illustrates a block diagram showing a configuration of a vehicle system including a platooning control apparatus according to an exemplary embodiment of the present disclosure, and FIG. 2 illustrates an operation flow of a platooning control apparatus according to an exemplary embodiment of the present disclosure.

A leading vehicle LV and following vehicles FV included in a platooning vehicle group may perform platooning on a road. The leading vehicle LV and following vehicles FV1, FV2, FV3, . . . , and FVn may drive while maintaining a predetermined distance. While driving, the leading vehicle LV or the following vehicle FV1 may adjust a distance between the leading vehicle LV and the following vehicle FV1. The leading vehicle LV or the following vehicle FV1 may increase or decrease an inter-vehicle distance depending on driver manipulation. The leading vehicle LV and the following vehicles FV may provide an intuitive and simple user interface to a driver in order to receive an input for adjusting the inter-vehicle distance.

The leading vehicle LV and the following vehicles FV1, FV2, FV3, . . . , and FVn may determine whether they collide with an obstacle in front while driving, and may predict whether they collide with a vehicle in front during braking control.

Accordingly, the leading vehicle LV and the following vehicles FV1, FV2, FV3, . . . , FVn may perform braking control to prevent a collision, and may operate an anti-lock brake system (ABS).

The ABS helps the driver to cope with a danger by keeping a state in which steering control of tires is possible even when the driver makes emergency braking. In other words, when the driver performs emergency braking in an emergency situation, although tires stop, a vehicle cannot stop immediately due to strong inertia, and the vehicle slips, and tire marks remain on the road due to strong friction between the braked tires and a rough road surface. This phenomenon is called a brake lock phenomenon, and when such a brake lock phenomenon occurs, longitudinal control and lateral control of the tires may become impossible, leading to an accident, and thus the ABS may control braking pressure applied to four wheels of the vehicle such that steering control of the tires is possible even when the driver performs emergency braking.

Accordingly, the leading vehicle LV and the following vehicles FV1, FV2, FV3, . . . , and FVn may increase or decrease the braking pressure for each wheel of the vehicle depending on whether the ABS is operated during the emergency braking.

In addition, the leading vehicle LV and the following vehicles FV1, FV2, FV3, . . . , and Fvn may increase the braking pressure applied to each wheel depending on an abnormal braking force curve when the ABS is not operated during the emergency braking, and may perform braking control or avoidance control depending on whether collision avoidance is possible because, when the ABS is operated, applied braking pressure exceeds road surface friction to cause slip, and thus it is difficult to additionally increase braking pressure.

Accordingly, the leading vehicle LV and the following vehicles FV1, FV2, FV3, . . . , and Fvn may secure a side impact and minimize an amount of impact during a collision by avoiding loss of lateral friction during braking and adding yaw moment through optimal control of one side partial friction coefficient while maintaining more than a braking power of a combined brake system (CBS). In addition, in the event of a platooning collision, it is possible to secure safety for additional accidents of following vehicles by performing a zigzag turn between front and rear vehicles.

Referring to FIG. 1, a vehicle system 10 according to an exemplary embodiment of the present disclosure includes a platooning control apparatus 100, a sensing device 200, a global positioning system (GPS) receiving device 300, a communication device 400, a navigation 500, an interface device 600, a steering control device 700, a braking control device 800, and an engine control device 900.

The platooning control apparatus 100 may determine a possibility of a collision occurring during platooning, and when the collision possibility exists, may perform collision avoidance control or braking control depending on whether the ABS is operated by determining whether the ABS is operated.

In particular, the platooning control apparatus 100 minimizes a braking distance by increasing braking pressure applied to each wheel of a vehicle when the collision possibility exists but the ABS is not operated, and determines whether avoidance is possible because, when the ABS is operated, applied braking pressure exceeds road surface friction to cause slip, and thus it is difficult to additionally increase braking pressure.

Accordingly, the apparatus 100 may calculate a depressurization amount of the braking pressure depending on a vehicle speed, a vehicle weight, and a state of a road surface when the avoidance control is possible during ABS operation, and may control eccentric braking depending on the depressurization amount of the braking pressure, to perform the avoidance control.

The platooning control apparatus 100 which is operated as the above may be implemented in a form of an independent hardware device including a memory and a processor that processes each operation, and may be driven in a form included in other hardware devices such as a microprocessor or a general purpose computer system.

The platooning control apparatus 100 may include a storage 110 and a processor 120.

The storage may store sensing results of the sensing device 200, GPS information received from the GPS receiving device 300, traffic light information received from the communication device 400, vehicle information and traffic condition information of vehicles in the platooning group received from other vehicles, road information received from the navigation 500, data obtained by the processor 120, and data and/or algorithms required for the platooning control apparatus 100 to operate.

As an example, the storage 110 may store information related to whether a preceding vehicle is braked, an ABS flag of a host vehicle, a result of determining whether to follow required deceleration of the host vehicle, side and lateral rear vehicle information of the host vehicle, slip information for each vehicle speed of the host vehicle, weight information of the host vehicle, side and lateral rear environmental information, and the like. In addition, the storage 110 may store positioning information, vehicle speed information, and the like of the preceding vehicle received through V2X communication. In addition, the storage 110 may store information related to a front obstacle, e.g., a vehicle in front, sensed by the sensing device 200.

As an example, the storage 110 may store a road surface determination map as illustrated in FIG. 12 and a depressurization amount setting map as illustrated in FIG. 13. The road surface determination map includes a resiling speed depending on a vehicle speed, a vehicle weight, and a road surface, and the depressurization amount setting map includes a depressurization amount depending on a vehicle speed, a vehicle weight, and a road surface. Such a road surface determination map and such a depressurization amount setting map may be set in advance by experiment values to be stored.

The storage 110 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 120 may be electrically connected to the storage 110, may electrically control each component, and may be an electrical circuit that executes software commands, thereby performing various data processing and calculations described below. The processor 120 may be, e.g., an electronic control unit (ECU), a micro controller unit (MCU), or other subcontrollers mounted in the vehicle.

The processor 120 may determine a possibility of a collision occurring during platooning, and when the collision possibility exists, may perform collision avoidance control or braking control depending on whether the ABS is operated by determining whether the ABS is operated.

The processor 120 may calculate a depressurization amount of the braking pressure depending on a vehicle speed, a vehicle weight, and a state of a road surface, and may control partial depending on the depressurization amount of the braking pressure.

The processor 120 may determine the state of a road surface depending on a speed resilience, a vehicle speed, and a vehicle weight.

When collision avoidance is possible during ABS operation, the processor 120 may control an avoidance direction of following vehicles in a zigzag form based on a preceding vehicle.

The processor 120 may maintain ABS control by applying a highest road surface friction coefficient to wheels inside turning when the collision avoidance control is possible during ABS operation, and may reduce the braking pressure applied to wheels outside turning to perform partial eccentric braking.

The processor 120 may maintain steering control when the ABS is not operated and control an increase of the braking pressure of vehicle wheels depending on an abnormal braking force curve, and may increase the braking pressure applied to front wheels of the vehicle and decrease the braking pressure applied to rear wheels depending on the abnormal braking force curve when deceleration of the vehicle is increased.

When the collision avoidance control is impossible during ABS operation, the processor 120 may perform slip control of vehicle wheels capable of maintaining steering control and minimizing a braking distance of the vehicle wheels.

When there is a possibility of a vehicle collision, the processor 120 may induce a side collision of the vehicle by controlling the collision avoidance control and left rest slip and right wheel slip.

The processor 120 may calculate a stopping braking distance of the preceding vehicle and a stopping braking distance of the host vehicle by using deceleration of the preceding vehicle and deceleration of the host vehicle, and may determine using the stopping braking distance of the preceding vehicle and the stopping braking distance of the host vehicle.

Referring to FIG. 2, the processor 120 may calculate the stopping braking distance of the preceding vehicle and the stopping braking distance of the host vehicle by using the deceleration information of the preceding vehicle and the deceleration information of the host vehicle, and may determine that a collision may occur when a value obtained by subtracting the stopping braking distance of the preceding vehicle from the stopping braking distance of the host vehicle is greater than a current inter-vehicle distance between the preceding vehicle and the subject vehicle (S101).

The processor 120 determines whether the ABS is operated, and maintains braking pressure increasing control and steering control when the ABS is not operated (S102). In this case, the processor 120 calculates a braking pressure increasing ratio corresponding to deceleration of the host vehicle based on the abnormal braking force curve in consideration of a weight of the host vehicle, and increases braking pressure applied to each wheel of the vehicle depending on the calculated braking pressure increasing ratio.

The processor 120 determines whether collision avoidance is possible, when pressure applied during the ABS operation exceeds the road surface frictional force to cause slip so as to make it impossible to additionally increase the braking pressure (S103). In this case, the processor 120 may determine whether collision avoidance is possible depending on whether there is a vehicle running around the host vehicle and/or in a lane next thereto.

When side and lateral rear collision avoidance control is impossible, the processor 120 maintains an original steering control value, and minimizes a braking distance to all wheels through optimal ABS slip control based on a Mu slip curve (S104).

When the side and lateral rear collision avoidance control is possible, the processor 120 performs avoidance steering control in a zigzag direction based on the preceding vehicle (S105). In this case, the processor 120 determines an average resilience in the wheels, maintains optimal control of a turning inside ABS slip frictional force, determines a state of the road surface based on the road surface determination map, and determines a turning outside depressurization amount depending on the determined state of the road surface, to perform turning avoidance steering (zigzag) and wheel braking pressure depressurization control (S106).

Subsequently, the processor 120 transmits a wheel braking pressure control command and a steering control command for collision avoidance control to the communication device 400 to transmit them to an external platooning device.

As such, according to the present disclosure, it is possible to minimize an impact through optimal control of the road surface friction coefficient when a collision caused by emergency braking of a platooning vehicle occurs. In other words, according to the present disclosure, it is possible to induce a side collision instead of a frontal collision by using avoidance steering and left and right wheel slip control through optimization of the road surface friction coefficient in the collision of the platooning vehicle.

In addition, according to the present disclosure, it is possible to prevent collision by minimizing the braking distance by increasing the braking pressure of the front and rear wheels in consideration of the abnormal braking force curve because the braking force can be increased and an amount of impact can be reduced by pressure that is additionally increased by the braking pressure before excessive slip on a road surface occurs when the ABS is not operated.

According to the present disclosure, it is also possible to maintain existing steering and ABS control when avoidance braking is impossible due to side and lateral rear obstacles because it is impossible to additionally increase the braking pressure due to excessive slip on the road surface during ABS operation.

In addition, according to the present disclosure, it is possible to perform partial eccentric braking when collision avoidance braking is possible because there are no side and lateral rear obstacles during ABS operation. In other words, it is possible to control collision avoidance by maintaining the ABS control for applying the highest friction coefficient to the wheels inside the turning and reducing the braking pressure of the wheels outside the turning. In addition, according to the present disclosure, it is possible to minimize a possibility of a collision by performing steering control in a zigzag form with respect to the preceding vehicle when selecting an avoidance direction.

The sensing device 200 may include one or more sensors that sense an obstacle, e.g., a preceding vehicle, located around the host vehicle and measure a distance with the obstacle and/or a relative speed thereof. The sensing device 200 may include a plurality of sensors to obtain such external information, and may further include a camera, a radar ultrasonic sensor, a laser scanner and/or a corner radar, a lidar, an acceleration sensor, a yaw rate sensor, a torque measurement sensor and/or a wheel speed sensor, a steering angle sensor, and the like.

The GPS receiving device 300 receives GPS information and provides it to the platooning control apparatus 100. Accordingly, the platooning control apparatus 100 may check a position of the vehicle based on the GPS information.

The communication device 400, which is a hardware device implemented with various electronic circuits to transmit and receive signals through a wireless or wired connection, may perform V2X, V2V, or V2I communication by using an in-vehicle network communication technique or a wireless Internet access or short range communication technique with servers, infrastructure, and other vehicles outside the vehicle in the present disclosure.

Herein, in-vehicle communication may be performed through controller area network (CAN) communication, local interconnect network (LIN) communication, or flexray communication as the in-vehicle network communication technique. In addition, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

For example, the communication device 400 may share platooning information with a platooning vehicle by transmitting or receiving it with respect thereto. In this case, the platooning information may include a destination, a route, a vehicle speed, an inter-vehicle distance, collision information, a collision avoidance command, and the like of the platooning vehicle.

The navigation 500 provides route and map information to destinations of platooning vehicles, and may provide road information to the platooning control apparatus 100.

The interface device 600 may include an input means for receiving a control command from a user and an output means for outputting an operation state of the platooning control apparatus 100 and results thereof.

Herein, the input means may include a key button, and may include a mouse, a joystick, a jog shuttle, a stylus pen, and the like. In addition, the input means may include a soft key implemented on the display. As an example, the input means may input approval or rejection for participation in a platooning vehicle group.

The output device may include a display, and may also include a voice output means such as a speaker. In this case, when a touch sensor formed of a touch film, a touch sheet, or a touch pad is provided on the display, the display may operate as a touch screen, and may be implemented in a form in which an input device and an output device are integrated. As an example, the output means may display platooning information, and for example, the platooning information may include information such as route information to a destination, communication contents with other vehicles, approval for participation in the platooning vehicle group, releasing the platooning vehicle group, and a platooning situation.

In this case, the display may include at least one of a liquid crystal display (LCD), a thin film transistor liquid crystal display (TFT LCD), a an organic light emitting diode display (OLED display), a flexible display, a field emission display (FED), and a 3D display.

The steering control device 700 may be configured to control a steering angle of a vehicle, and may include a steering wheel, an actuator interlocked with the steering wheel, and a controller controlling the actuator.

The braking control device 800 may be configured to control braking of the vehicle, and may include a controller that controls a brake thereof.

The engine control device 900 may be configured to control engine driving of a vehicle, and may include a controller that controls a speed of the vehicle.

As such, according to the present disclosure, in the case where emergency braking occurs during the platooning, it is possible to minimize a collision during platooning by increasing the braking pressure when the ABS is not operated, by determining whether avoidance is possible when the ABS is operated, by performing optimal braking control to minimize braking distances of all wheels when the avoidance is impossible, and by performing eccentric braking by determining a depressurization amount depending on the vehicle speed, the vehicle weight, and the state of the road surface to perform avoidance control when the avoidance is possible.

Figure 3:
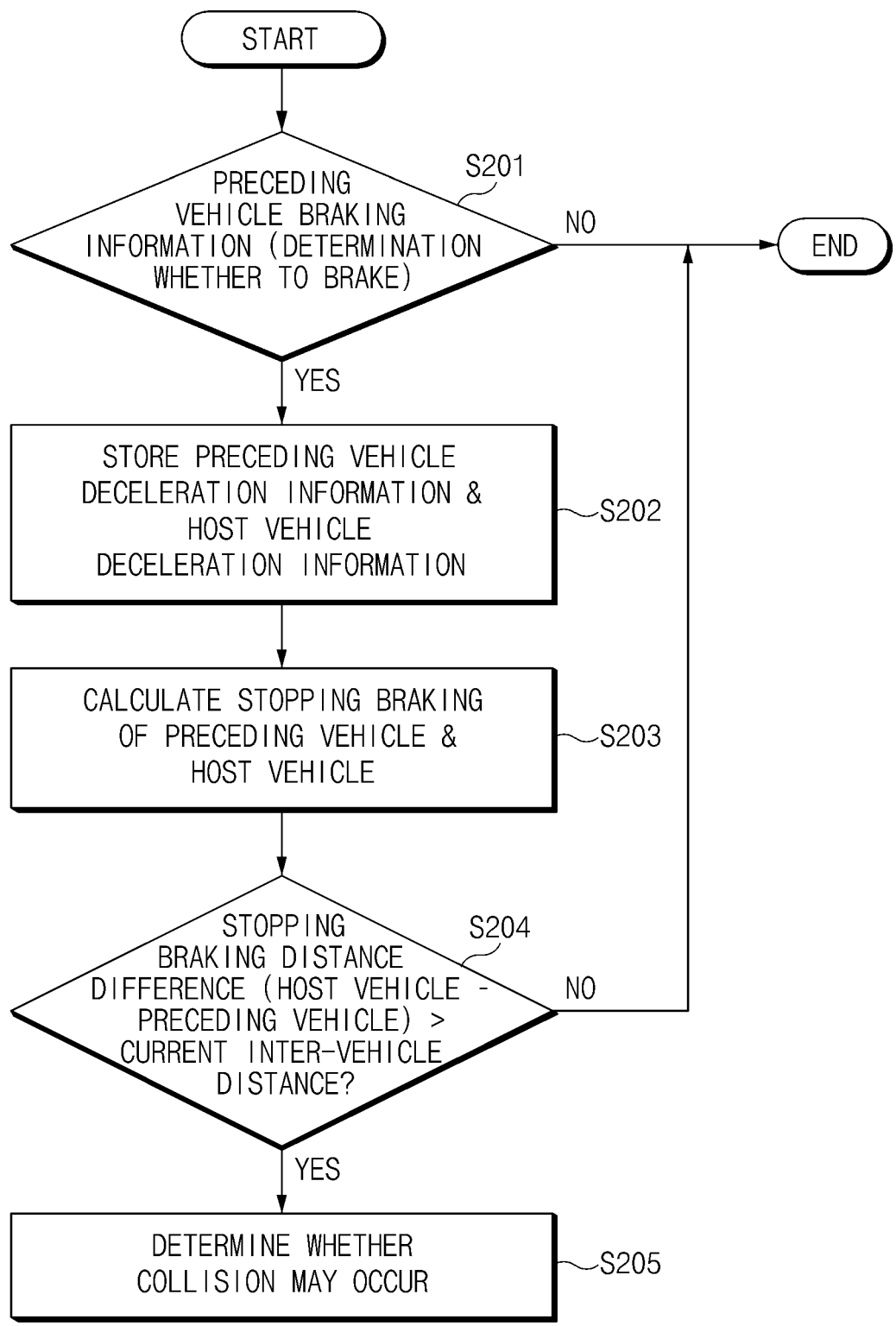
FIG. 3 illustrates a flowchart for describing a collision determination method of a platooning control apparatus in one form of the present disclosure.
Figure 4:
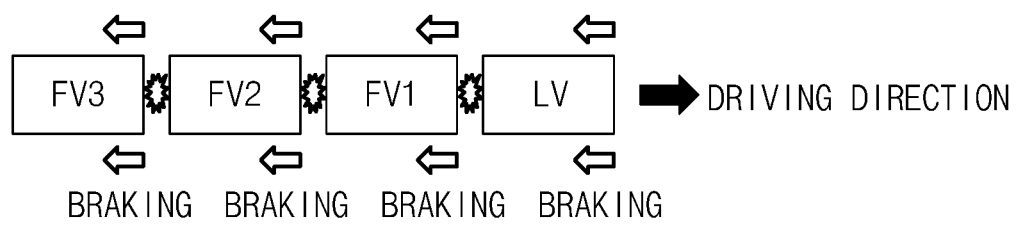
FIG. 4 illustrates an example of a screen showing a collision of a platooning vehicle in one form of the present disclosure.

Hereinafter, a platooning control method according to an exemplary embodiment of the present disclosure will be described in detail with reference to FIG. 3 and FIG. 4. FIG. 3 illustrates a flowchart for describing a collision determination method of a platooning control apparatus according to an exemplary embodiment of the present disclosure, and FIG. 4 illustrates an example of a screen showing a collision of a platooning vehicle according to an exemplary embodiment of the present disclosure.

Hereinafter, it is assumed that the platooning control apparatus 100 of the of FIG. 1 performs processes of FIG. 3. In addition, in the description of FIG. 3, operations described as being performed by a device may be understood as being controlled by the processor 120 of the platooning control apparatus 100.

Referring to FIG. 3, the platooning control apparatus 100 determines whether or not a preceding vehicle is braked based on braking information of the preceding vehicle received from the preceding vehicle (S201).

When the preceding vehicle is braked, the platooning control apparatus 100 of the host vehicle stores deceleration information of the preceding vehicle and deceleration information of the host vehicle (S202), and calculates a stopping braking distance of the preceding vehicle and a stopping braking distance of the host vehicle by using the deceleration information of the preceding vehicle and the deceleration information of the host vehicle (S203).

Subsequently, the platooning control apparatus 100 determines whether a difference between the stopping braking distance of the host vehicle and the stopping braking distance of the preceding vehicle is greater than a current inter-vehicle distance therebetween (S204), and when the difference is greater than the current inter-vehicle distance, determines that a collision will occur therebetween (S205).

As illustrated in FIG. 4, when emergency braking occurs during the platooning, the collision between platooning vehicles may occur.

Figure 5:
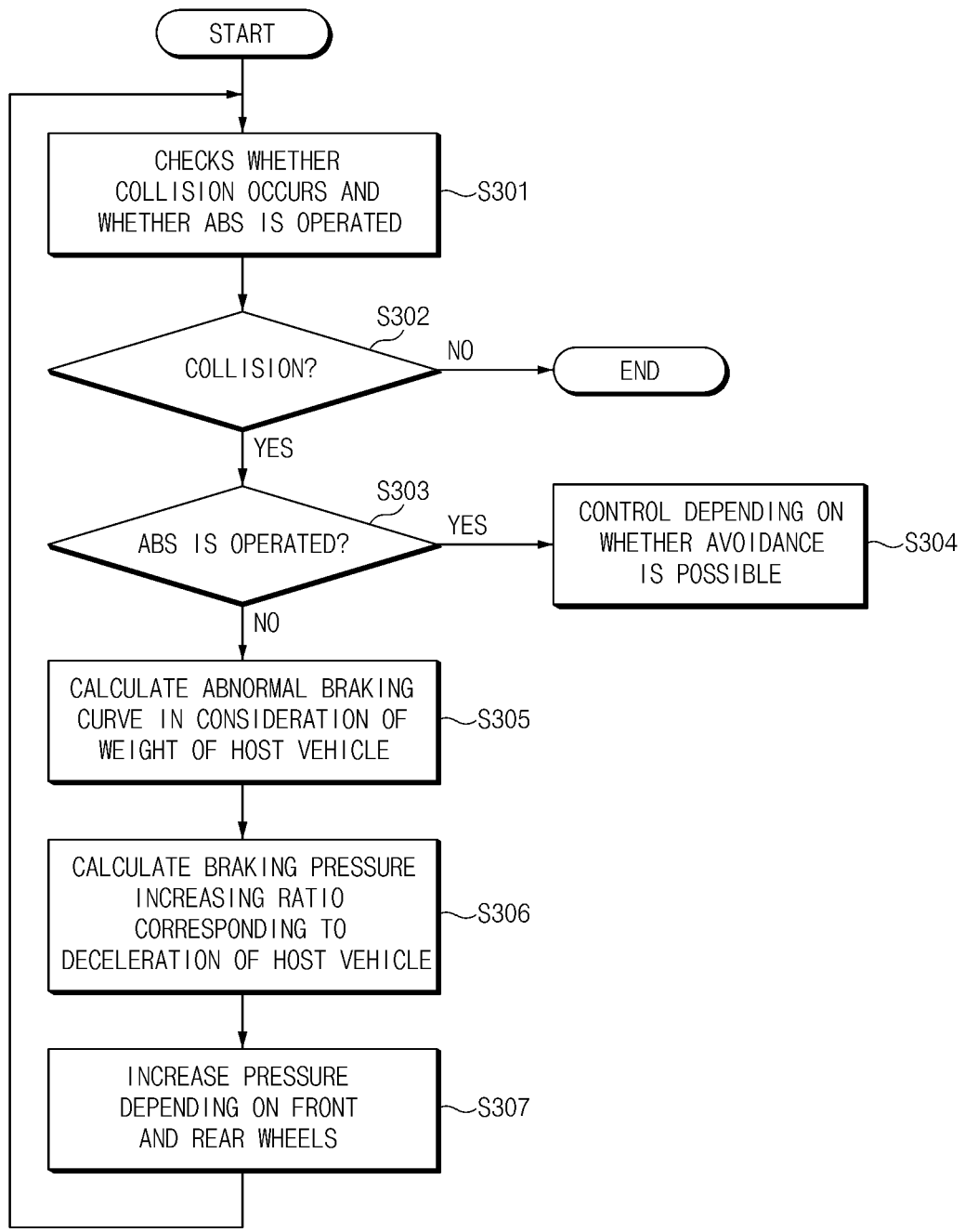
FIG. 5 illustrates a flowchart for specifically describing a method of controlling an increase in pressure when an ABS is not operated after determining a collision in one form of the present disclosure.
Figure 6:
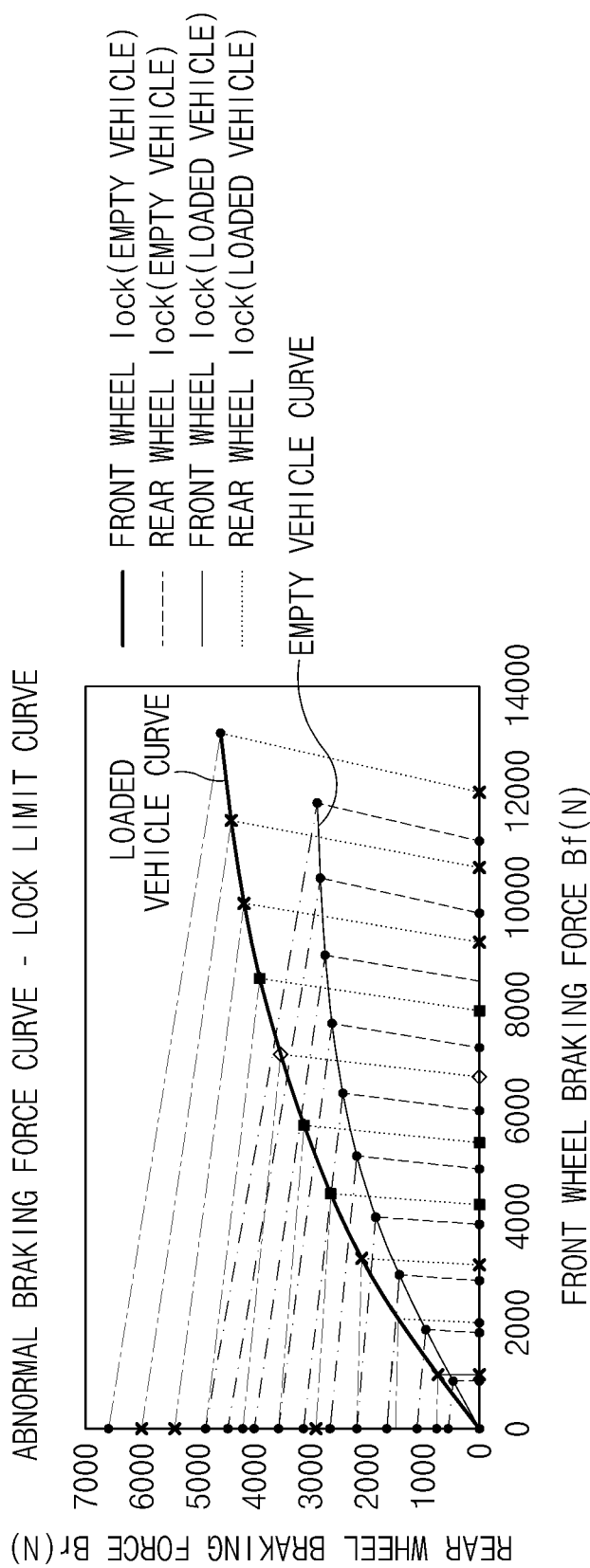
FIG. 6 illustrates a graph showing an abnormal braking force curve in one form of the present disclosure.

Hereinafter, a platooning control method for a vehicle according to an exemplary embodiment of the present disclosure will be described in detail with reference to FIG. 5 and FIG. 6. FIG. 5 illustrates a flowchart for specifically describing a method of controlling an increase in pressure when an ABS is not operated after determining a collision according to an exemplary embodiment of the present disclosure, and FIG. 6 illustrates a graph showing an abnormal braking force curve according to an exemplary embodiment of the present disclosure.

Hereinafter, it is assumed that the platooning control apparatus 100 of the of FIG. 1 performs processes of FIG. 5. In addition, in the description of FIG. 5, operations described as being performed by a device may be understood as being controlled by the processor 120 of the platooning control apparatus 100.

Referring to FIG. 5, the platooning control apparatus 100 checks whether a collision occurs and whether the ABS is operated (S301). That is, the platooning control apparatus 100 determines a possibility of a collision (S302), and when it is determined that the collision will occur, determines whether the ABS is operated (S303), and performs braking control depending on whether or not the avoidance is possible when the ABS is operated (S304).

On the other hand, when the ABS is not operated, the platooning control apparatus 100 calculates an abnormal braking force curve in consideration of a weight of the host vehicle (S305).

Subsequently, the platooning control apparatus 100 calculates a braking pressure increasing ratio for front and rear wheels corresponding to the deceleration of the host vehicle (S306).

Subsequently, the platooning control apparatus 100 controls an increase in pressure of the front and rear wheels depending on the braking pressure increasing ratio for the front and rear wheels corresponding to the deceleration of the host vehicle (S307).

When the ABS control is not operated, applied pressure does not exceed the frictional force on the road surface to not generate slip, so additional braking pressure may be increased. Accordingly, the platooning control apparatus 100 may calculate a difference ratio between the front and rear wheels in consideration of the abnormal braking force curve of FIG. 6.

When the vehicle deceleration is a, a front wheel braking force Bf and a rear wheel braking force Br are proportional to dynamic load distribution of a vehicle, and may be expressed as Equation 1.

$$B_f = \mu W_f = \frac{a}{g}\left(W_{fs} + W \cdot \frac{a}{g} \cdot \frac{h}{l}\right)$$

$$B_r = \mu W_r = \frac{a}{g}\left(W_{rs} - W \cdot \frac{a}{g} \cdot \frac{h}{l}\right)$$

(Equation 1)

Herein, Bf indicates a braking force of front wheels, Br indicates a braking force of rear wheels, and m indicates a road surface friction coefficient. m=a/g, "a" indicates vehicle deceleration, "g" indicates gravitational acceleration, Wf indicates a weight of the front wheels, Wr indicates a weight of the rear wheels weight, W indicates a vehicle weight, "h" indicates a center of mass, and "l" indicates a wheelbase.

As illustrated in FIG. 6, an abnormality curve of an loaded vehicle and an abnormality curve of an empty vehicle depending on the front braking force Bf and the rear wheel braking force Br are illustrated, and the front wheel braking force Bf increases as the vehicle deceleration increases.

When the abnormal braking force curve as illustrated in FIG. 6 is used, it is possible to additionally increase the pressure from the vehicle deceleration to a road surface limit point considering movement of the center of gravity of the vehicle based on weight information of the vehicle (vehicle/front and rear wheels).

For example, when the vehicle deceleration is increased to 0.6 g in real time before ABS operation while the vehicle is braked at the vehicle deceleration of 0.5 g, a braking pressure ratio of the front wheels may be increased from 68% to 72%, and a braking pressure ratio of the rear wheels may be decreased from 32% to 28%.

As such, the braking pressure ratio may be preset by experimental values depending on the abnormal braking force curve and the vehicle deceleration to be stored.

Figure 7:
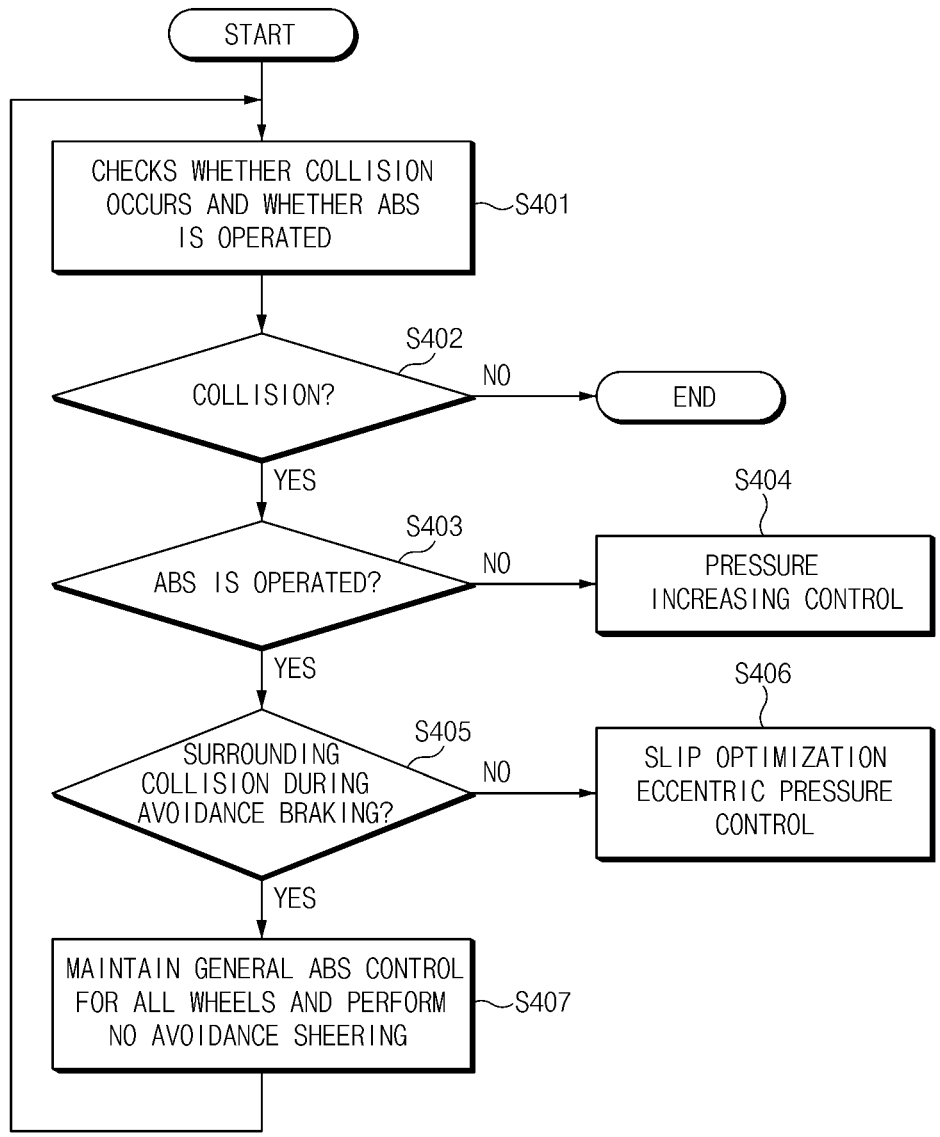
FIG. 7 illustrates a flowchart for specifically describing a control method when avoidance control is impossible in the case where an ABS is operated after determining a collision in one form of the present disclosure.
Figure 8:
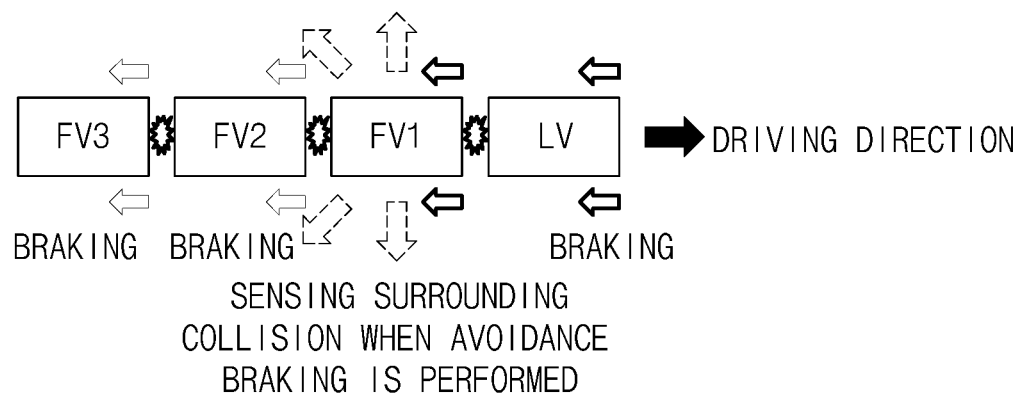
FIG. 8 illustrates a view for describing avoidable control of a platooning vehicle in one form of the present disclosure.

Hereinafter, a platooning control method for a vehicle according to an exemplary embodiment of the present disclosure will be described in detail with reference to FIG. 7 and FIG. 8. FIG. 7 illustrates a flowchart for specifically describing a control method when avoidance control is impossible in the case where an ABS is operated after determining a collision according to an exemplary embodiment of the present disclosure, and FIG. 8 illustrates a view for describing avoidable control of a platooning vehicle according to an exemplary embodiment of the present disclosure.

Hereinafter, it is assumed that the platooning control apparatus 100 of the of FIG. 1 performs processes of FIG. 7. In addition, in the description of FIG. 7, operations described as being performed by a device may be understood as being controlled by the processor 120 of the platooning control apparatus 100.

Referring to FIG. 7, the platooning control apparatus 100 checks collision determination and whether the ABS is operated (S401), determines whether a collision occurs (S402), determines whether the ABS is operated when it is determined that the collision occurs (S403), and performs pressure increasing control when the ABS is not operated (S404).

On the other hand, when the ABS is operated, the platooning control apparatus 100 whether there is surrounding collision during avoidance braking (S405), and when the avoidance braking is possible (when the surrounding collision does not occur during the avoidance braking), performs slip optimization eccentric pressure control (S406).

On the other hand, when the avoidance braking is impossible (when the avoidance collision occurs during the avoidance braking), the platooning control apparatus 100 maintains general ABS control for all wheels of a vehicle and does not perform avoidance steering (S407). FIG. 8 illustrates an example in which the following vehicle FV1 senses a surrounding collision during avoidance braking for avoiding a collision when emergency braking is performed during platooning.

Figure 9:
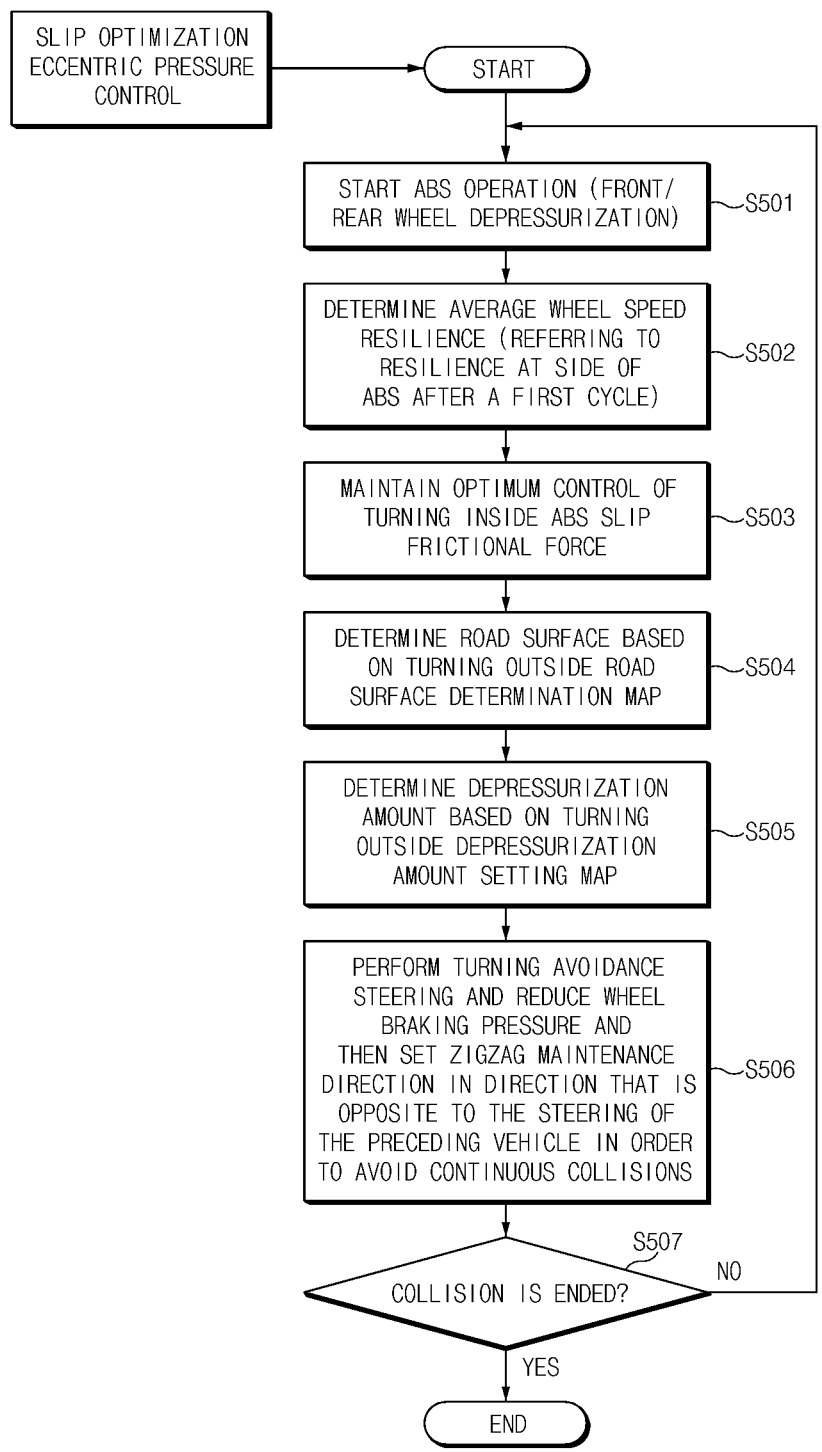
FIG. 9 illustrates a flowchart for describing unavoidable control of a platooning vehicle in one form of the present disclosure.

Hereinafter, the driving control method for a vehicle according to an exemplary embodiment of the present disclosure will be described in detail with reference to FIG. 9 to FIG. 13. FIG. 9 illustrates a flowchart for describing unavoidable control of a platooning vehicle according to an exemplary embodiment of the present disclosure, and FIG. 10A, FIG. 10B, FIG. 10C, and FIG. 10D illustrate views for describing an example of optimal frictional force control using a Mu slip curve according to an exemplary embodiment of the present disclosure. FIG. 11A and FIG. 11B illustrate views for describing a vehicle traveling direction according to an exemplary embodiment of the present disclosure, FIG. 12 illustrates an example of a screen showing a road surface determination map according to an exemplary embodiment of the present disclosure, and FIG. 13 illustrates an example of a screen showing a road surface determination map according to an exemplary embodiment of the present disclosure.

Hereinafter, it is assumed that the platooning control apparatus 100 of the of FIG. 1 performs processes of FIG. 9. In addition, in the description of FIG. 9, operations described as being performed by a device may be understood as being controlled by the processor 120 of the platooning control apparatus 100.

FIG. 9 illustrates a flowchart schematically showing a slip optimization eccentric pressure control process S406 of FIG. 7. Referring to FIG. 9, when ABS operation starts (depressurization of the front and rear wheels starts) (S501), the platooning control apparatus 100 determines a speed resilience, i.e., an average wheel speed resilience (S502). In this case, a resilience at a side of the ABS may be referred to after a first cycle. Herein, the speed resilience indicates a gradient of a region where the speed resiles when depressurized at an optimum ABC slip pressure.

The platooning control apparatus 100 maintains optimum control of a turning inside ABS slip frictional force (S503).

The platooning control apparatus 100 may determine a road surface based on a turning outside road surface determination map (FIG. 12) (S504).

The platooning control apparatus 100 may determine a depressurization amount based on a turning outside depressurization amount setting map (FIG. 13) (S505).

The platooning control apparatus 100 may perform turning avoidance steering and reduce wheel braking pressure (S506). In this case, the platooning control apparatus 100 may set a zigzag maintenance direction in a direction that is opposite to the steering of the preceding vehicle in order to avoid continuous collisions.

The platooning control apparatus 100 determines whether the collision situation has ended (S507). When the collision situation is ended, it ends.

Figure 10A:
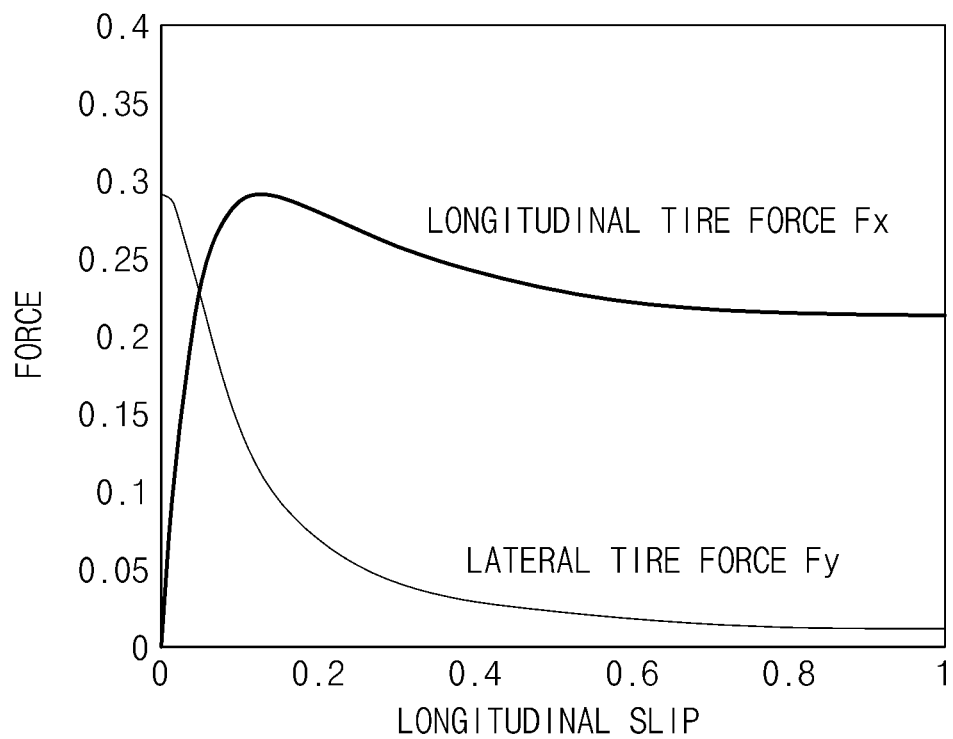
Figure 10B:
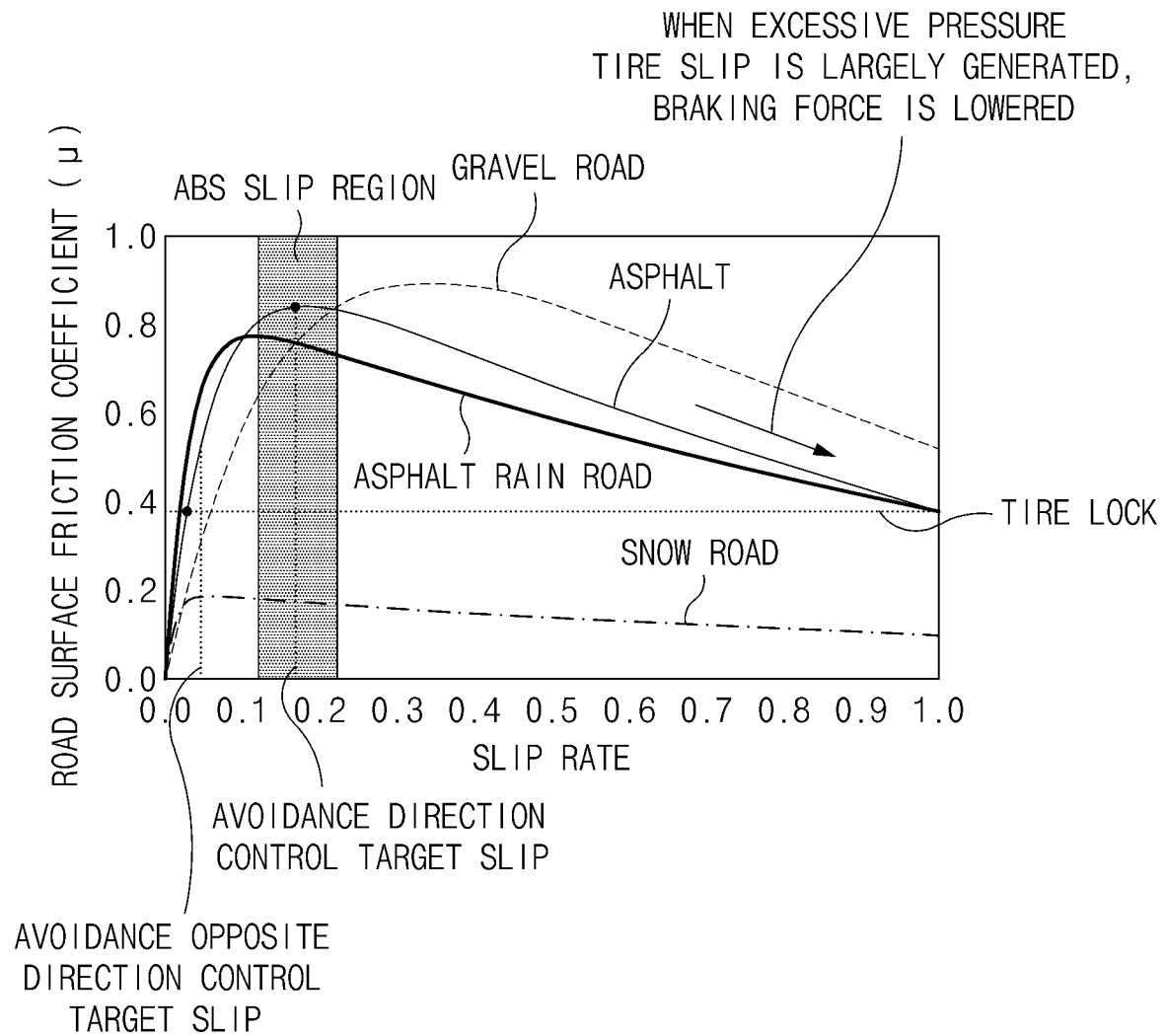

FIG. 10A illustrates a schematic view of a Mu slip curve, and FIG. 10B illustrates a detailed graph of friction coefficients depending on slip for each road surface. Referring to FIG. 10A, it can be seen that optimization can be made through longitudinal slip control, and it rapidly deteriorates in a lateral direction as the slip increases. For this reason, wheel lock is not performed at maximum pressure. Referring to FIG. 10B, it is possible to generate a friction coefficient and secure a turning force by controlling pressure for maintaining a left and right slip difference.

When avoidance is possible by a following vehicle in a next lane or a state of a road surface (an avoidable lane exists) during side and lateral rear avoidance steering, a braking turning force may be generated by applying eccentric braking pressure considering a friction coefficient of the Mu slip curve, so that the avoidance steering may be performed to prevent a side collision.

For minimizing collision energy, a partial ABS is applied to maximize slip of the wheels inside turning (ABS control is applied only to front and rear wheels thereinside), and the braking pressure applied to the wheels outside the turning is reduced to a value that compensates for delta P (depressurization amount) from optimum slip pressure for ABS entering for each road surface to maintain yaw moment until the collision is ended. A reason why the turning outside wheels are boosted to maximum pressure to find and depressurize a same frictional force without using a frictional force of a wheel lock point easily is that it is impossible to secure adjustment stability because a lateral tire frictional force drops sharply as illustrated in FIG. 10B.

The apparatus 100 may perform partial eccentric braking □ by maintaining the ABS control for applying a highest road surface friction coefficient to the wheels inside the turning and reducing the braking pressure applied to the wheel outside the turning, may determine the road surface depending on the vehicle weight and the vehicle speed based on a wheel speed resiling rate, and may perform eccentric braking pressure and avoidance steering application control o that generates a turning yaw moment continuing until the collision is ended by using depressurization from an optimal slip point pressure to a maximum pressure point pressure.

Figure 10C:
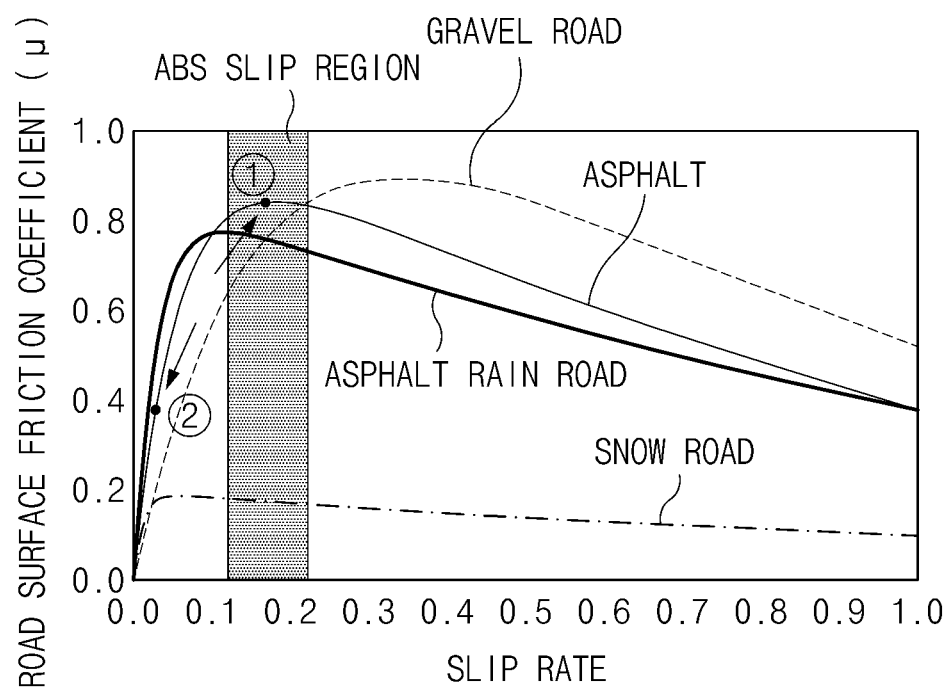
Figure 10D:
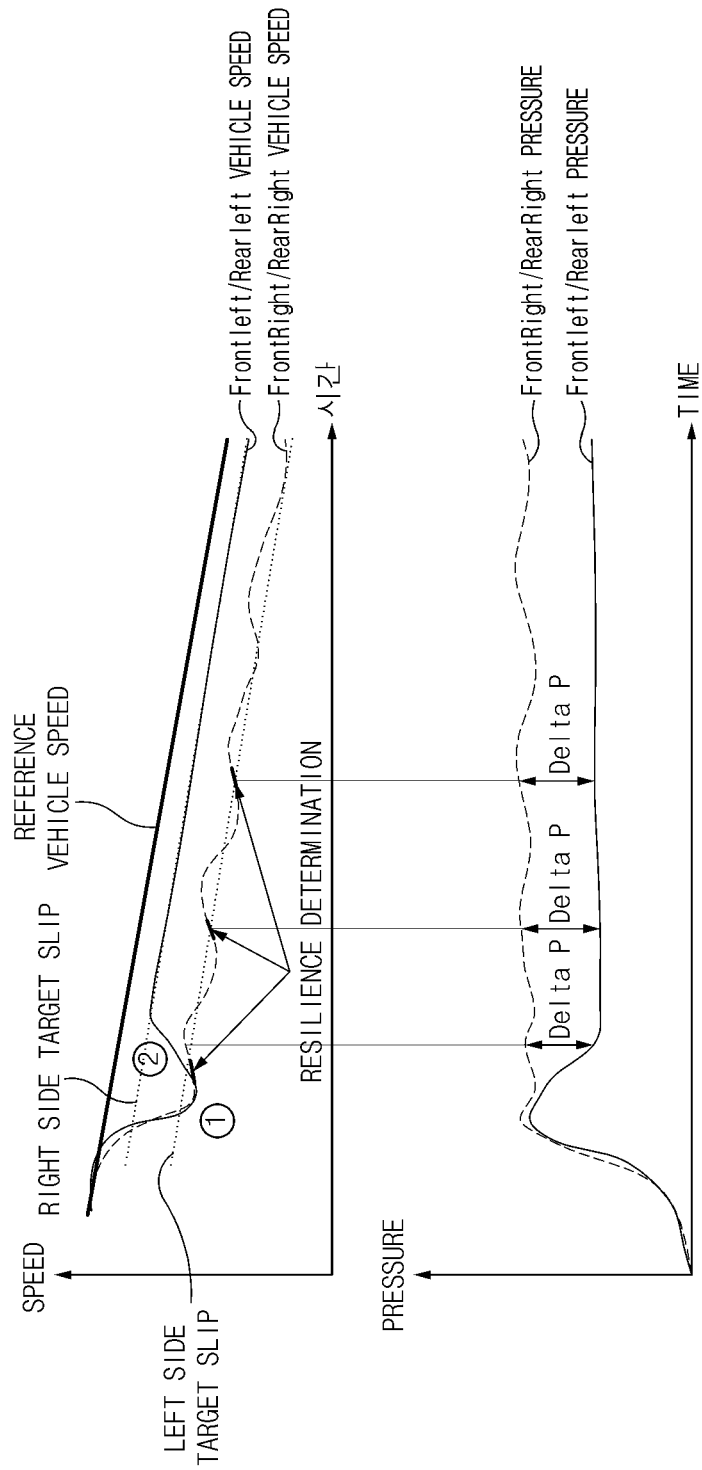

Referring to FIG. 10C and FIG. 10D, when slip occurs by an increase in pressure, the road surface cannot be determined by a slip slope due to foundation brake, pressure overshoot, etc., but during depressurization after the ABS, ① in the wheels, ② the speed resilience in the wheels may be divided in the form of a 3D measurement map depending on tire characteristics by a vehicle weight, a vehicle speed, and a road surface friction in a no-load state In FIG. 11A, when the vehicle must turn to a right side, a braking force applied to right wheels is greater than a braking force applied to left wheels. As such, it is possible to generate a steering and eccentric braking turning force of the vehicle by applying different braking forces to the left wheels and the right wheels.

FIG. 11B illustrates an example in which the following vehicles FV1 and FV2 perform avoidance control in a zigzag direction.

FIG. 12 illustrates a road surface determination map based on a table matching a vehicle speed for each vehicle weight and a wheel resilience depending on a road surface. That is, when the vehicle is an empty vehicle, a heavy vehicle, or a loaded (full) vehicle, a weight of the vehicle is changed, and the resilience is different depending on the vehicle speed and the road surface. The platooning control apparatus 100 may set and store such a road surface determination map by an experiment value in advance. In the present disclosure, the apparatus 100 may determine a state of the road surface depending on the vehicle speed, the vehicle weight, and the resilience by using the road surface determination map of FIG. 12. In this case, the state of the road surface may include an ice state, a snowy state, a rainy state, a dry state, and the like.

FIG. 13 illustrates a depressurization amount determination map based on a table matching the vehicle speed for each vehicle weight and the depressurization amount depending on the road surface. That is, when the vehicle is an empty vehicle, a heavy vehicle, or a loaded (full) vehicle, a weight of the vehicle is changed, and the depressurization amount is different depending on the vehicle speed and the road surface. The platooning control apparatus 100 may set and store such a depressurization amount determination map by an experiment value in advance. In the present disclosure, the apparatus 100 may determine the depressurization amount depending on the state of the road surface, the vehicle weight, and the resilience by using the depressurization amount determination map of FIG. 13.

For example, the platooning control apparatus 100 starts ABS slip control (maximum longitudinal deceleration) of the front and rear wheels during avoidance control in a clockwise direction. Immediately after the ABS operation, when the pressure decreases, an initial wheel speed increases, and an average resilience of a sloped wheel speed is 0.6 g, depressurization control is performed by continuing optimal ABS slip control of right front and rear wheels and determining the depressurization amount of the left front and the rear wheels. For example, when the vehicle speed is 80 KPH, the resilience is 6.0 g, and the vehicle weight is in a loaded vehicle state, the road surface may be determined to be dry asphalt.

Accordingly, when the vehicle speed is 80 KPH and the vehicle weight is in the loaded vehicle state, and when the road surface is dry asphalt, the depressurization amount relative to pressure at an optimal slip point at a right side may be determined as 1.05 bar.

Hereinafter, a platooning control method according to an exemplary embodiment of the present disclosure will be described in detail with reference to FIG. 14. FIG. 14 illustrates a flowchart for specifically describing a vehicle control method for reducing collision energy when emergency braking is performed during platooning driving according to an exemplary embodiment of the present disclosure. Hereinafter, it is assumed that the platooning control apparatus 100 of the of FIG. 1 performs processes of FIG. 14. In addition, in the description of FIG. 14, operations described as being performed by a device may be understood as being controlled by the processor 120 of the platooning control apparatus 100.

Referring to FIG. 14, the platooning control apparatus 100 determines whether the ABS is not operated (S601), maintains an original steering control value when the ABS is not operated, and transmits a pressure increasing (PCV pressure control valve) operation command based on an abnormal braking force curve (S602). Subsequently, the apparatus 100 may transmit the pressure increasing operation command to the platooning vehicles by using wireless communication (S603).

The platooning control apparatus 100 determines whether side and lateral rear avoidance control is impossible when the ABS is operated (S604), and when the avoidance control is impossible, commands operations of maintaining an original steering control value and maintaining optimal ABS slip control (PCV pressure control valve) (S605). Subsequently, the apparatus 100 may transmit a command for the operation of maintaining the optimal ABS slip control (PCV pressure control valve) to the platooning vehicles by using wireless communication (S603).

When the avoidance control is possible in step S604, the platooning control apparatus 100 commands operations of performing a preceding vehicle reference zigzag avoidance steering, maintaining turning inside optimal ABS slip control, and performing turning outside (PCV pressure control valve) (S606). Subsequently, the platooning control apparatus 100 may transmit commands for performing preceding vehicle reference zigzag avoidance steering, maintaining the turning inside optimal ABS slip control, and performing the turning outside (PCV pressure control valve) to the platooning vehicles by using wireless communication (S603).

As such, according to the present disclosure, it is possible to prevent an impact of a chain collision from being concentrated on a preceding vehicle by using a grip force between a tire and a road surface in all cases of a region at which braking pressure that is lower than critical friction of the road surface is generated (before ABS entering) or after a road surface limit (ABS control application/wheel slip generation) when emergency braking is performed during platooning.

FIG. 15 illustrates a computing system according to an exemplary embodiment of the present disclosure.

Referring to FIG. 15, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A platooning control apparatus comprising:
a processor configured to:
determine a possibility of a collision during platooning;
when the possibility of the collision exists, perform collision avoidance control or braking control depending on whether an anti-lock brake system (ABS) is operated;
when the collision avoidance control is possible while the ABS is operated, calculate a depressurization amount of braking pressure based on a vehicle speed, a vehicle weight, and a state of a road surface; and
control eccentric braking based on the depressurization amount of the braking pressure; and
a storage configured to store data obtained by the processor and an algorithm for driving the processor,
wherein the processor is configured to:
when the collision avoidance control is possible while the ABS is operated, maintain ABS control by applying a highest road surface friction coefficient to wheels inside turning;
reduce braking pressure applied to wheels outside the turning to perform partial eccentric braking; and
maintain steer control when the ABS is not operated; and
increase braking pressure of wheels based on an abnormal braking force curve.

2. The platooning control apparatus of claim 1, wherein the processor is configured to:
determine the state of the road surface based on a speed resilience, the vehicle speed, and the vehicle weight.

3. The platooning control apparatus of claim 1, wherein the storage is further configured to:
store a road surface determination map for storing a speed resilience matched to the vehicle speed and the state of the road surface for each vehicle weight; and
store a depressurization amount setting map for storing the depressurization amount matched to the vehicle speed and the state of the road surface for each vehicle weight.

4. The platooning control apparatus of claim 1, wherein the processor is configured to:
when the collision avoidance control is possible while the ABS is operated, control an avoidance direction of following vehicles in a zigzag form based on a preceding vehicle.

5. The platooning control apparatus of claim 1, wherein the processor is further configured to:

increase braking pressure applied to front wheels of a vehicle among the wheels; and
decrease braking pressure applied to rear wheels among the wheels of the vehicle based on the abnormal braking force curve when deceleration of the vehicle is increased.

6. The platooning control apparatus of claim 1, wherein the processor is further configured to:
When the collision avoidance control is impossible while the ABS is operated, perform slip control of the wheels such that steering control is maintained and a braking distance of the wheels is minimized.

7. The platooning control apparatus of claim 1, wherein the processor is further configured to:
induce a side collision of the vehicle by controlling the collision avoidance control and left wheel slip and right wheel slip when the possibility of the collision exists.

8. The platooning control apparatus of claim 1, wherein the processor is configured to:
calculate a stopping braking distance of a preceding vehicle and a stopping braking distance of a host vehicle by using deceleration of the preceding vehicle and deceleration of the host vehicle; and
determine the possibility of the collision by using the stopping braking distance of the preceding vehicle and the stopping braking distance of the host vehicle.

9. A vehicle system comprising:
a platooning control apparatus configured to:
determine a possibility of a collision during platooning;
when the possibility of the collision exists, perform collision avoidance control or braking control depending on whether an anti-lock brake system (ABS) is operated;
when the collision avoidance control is possible while the ABS is operated, calculate a depressurization amount of braking pressure based on a vehicle speed, a vehicle weight, and a state of a road surface; and
control eccentric braking based on the depressurization amount of the braking pressure; and
a communication device configured to transmit commands of the collision avoidance control and the braking control received from the platooning control apparatus to platooning vehicles,
wherein the platooning control apparatus is configured to:
when the collision avoidance control is possible while the ABS is operated, maintain ABS control by applying a highest road surface friction coefficient to wheels inside turning;
reduce braking pressure applied to wheels outside the turning to perform partial eccentric braking; and
maintain steer control when the ABS is not operated; and
increase braking pressure of wheels based on an abnormal braking force curve.

10. The vehicle system of claim 9, wherein the platooning control apparatus is further configured to:
determine the state of the road surface based on a speed resilience, the vehicle speed, and the vehicle weight.

11. The vehicle system of claim 9, wherein the platooning control apparatus is further configured to:
when the collision avoidance control is possible while the ABS is operated, control an avoidance direction of following vehicles in a zigzag form based on a preceding vehicle.

12. A platooning control method comprising:
determining a possibility of a collision during platooning;

determining whether an anti-lock brake system (ABS) is operated when the possibility of the collision exists;

performing a collision avoidance control or a braking control depending on whether the ABS is operated; and transmitting commands of the collision avoidance control and the braking control to platooning vehicles, wherein the performing of the collision avoidance control or the braking control includes:

when the collision avoidance control is possible while the ABS is operated, maintaining ABS control by applying a highest road surface friction coefficient to wheels inside turning;

reducing braking pressure applied to the wheels outside the turning to perform partial eccentric braking;

maintaining steer control when the ABS is not operated; and increasing braking pressure of wheels based on an abnormal braking force curve.

13. The platooning control method of claim 12, wherein the determining of the possibility of the collision during the platooning includes:

calculating a stopping braking distance of a preceding vehicle and a stopping braking distance of a host vehicle by using deceleration of the preceding vehicle and deceleration of the host vehicle; and determining the possibility of the collision by using the stopping braking distance of the preceding vehicle and the stopping braking distance of the host vehicle.

14. The platooning control method of claim 12, wherein the performing of the collision avoidance control or the braking control includes:

determining a state of a road surface based on a speed resilience, a vehicle speed, and a vehicle weight.

15. The platooning control method of claim 12, wherein the performing of the collision avoidance control or the braking control includes:

when the collision avoidance control is possible while the ABS is operated, controlling an avoidance direction of following vehicles in a zigzag form based on a preceding vehicle.

\* \* \* \* \*